United States Patent
Ruff et al.

(10) Patent No.: US 7,731,118 B2
(45) Date of Patent: Jun. 8, 2010

(54) ACCELERATION SENSOR

(75) Inventors: Stephen Anthony Ruff, Chesham (GB); Alan David Crozier, London (GB)

(73) Assignee: Martin-Baker Aircraft Co., Ltd. (GB)

( * ) Notice: Subject to any disclaimer, the term of this patent is extended or adjusted under 35 U.S.C. 154(b) by 368 days.

(21) Appl. No.: 11/691,779

(22) Filed: Mar. 27, 2007

(65) Prior Publication Data

US 2007/0228203 A1 Oct. 4, 2007

(30) Foreign Application Priority Data

Mar. 29, 2006 (GB) ................................. 0606272.3
Mar. 23, 2007 (GB) ................................. 0705663.3

(51) Int. Cl.
*B60R 22/38* (2006.01)

(52) U.S. Cl. ............... 242/382.2; 242/384.5; 242/384.6

(58) Field of Classification Search ............. 242/384.6, 242/383.2, 383.3, 383.4, 384.2, 384.3, 384.4, 242/384.5; 73/514.38, 514.01; 280/806
See application file for complete search history.

(56) References Cited

U.S. PATENT DOCUMENTS

| | | | | |
|---|---|---|---|---|
| 3,180,456 A | * | 4/1965 | Whittingham | ............... 188/189 |
| 3,711,037 A | * | 1/1973 | Jakob | ...................... 242/383.1 |
| 3,838,832 A | | 10/1974 | Romanzi | |
| 4,108,394 A | * | 8/1978 | Oishi et al. | ............... 242/382.5 |
| 4,244,537 A | * | 1/1981 | Labeur | .................... 242/382.5 |
| 4,452,405 A | * | 6/1984 | Adomeit | ................... 242/383.4 |
| 4,463,917 A | * | 8/1984 | Mori et al. | ................ 242/383.5 |
| 4,467,981 A | | 8/1984 | Mori | |
| 4,522,350 A | | 6/1985 | Ernst | |
| 5,351,908 A | * | 10/1994 | Umezawa et al. | ......... 242/383.4 |
| 5,568,941 A | * | 10/1996 | Woydick et al. | ............ 280/806 |
| 5,636,807 A | | 6/1997 | Warrick | |
| 5,660,444 A | | 8/1997 | Thomas | |
| 6,202,952 B1 | * | 3/2001 | Kopetzky | .................. 242/384.4 |
| 2003/0209074 A1 | | 11/2003 | Ruff | |
| 2005/0133652 A1 | * | 6/2005 | Kielwein | .................. 242/383.4 |
| 2006/0144984 A1 | * | 7/2006 | Daeuber et al. | ........... 242/384.2 |

FOREIGN PATENT DOCUMENTS

| | | |
|---|---|---|
| EP | 1102070 | 5/2001 |
| GB | 2010071 | 6/1979 |
| GB | 2309785 A | 8/1997 |
| GB | 2349120 A | 10/2000 |
| GB | 2388430 A | 11/2003 |

OTHER PUBLICATIONS

UK Patent Office; Combined Search and Examination Report concerning corresponding GB App. 0606272.3; Jul. 3, 2006; 6 pages.
UK Patent Office; Search Report concerning corresponding GB App. 0705663.3; Jul. 19, 2007; 1 page.

* cited by examiner

*Primary Examiner*—Sang Kim
(74) *Attorney, Agent, or Firm*—Hancock Hughey LLP

(57) ABSTRACT

A holding mechanism for a vehicular acceleration sensor, comprising: a pair of lever arms operable to move independently of one another; and an inertia weight held between the lever arms, wherein movement of the inertia weight, in use, when under acceleration, causes at least a part of at least one lever arm or both arms to move in a generally linear direction.

21 Claims, 12 Drawing Sheets

ACCELERATION SENSOR

FIELD OF THE INVENTION

This invention relates to an acceleration sensor and more particularly to an acceleration sensor to sense vehicle acceleration and provide an output upon a vehicle experiencing an acceleration exceeding a threshold acceleration.

BACKGROUND OF THE INVENTION

Vehicular acceleration sensors for providing an output when an acceleration threshold has been exceeded are known, especially for sensing an acceleration along a particular axis, i.e. in a particular direction. Some attempts have been made to provide so-called omni-directional acceleration sensors which provide an output when an acceleration threshold is exceeded in any direction. Such acceleration sensors are mechanical devices including an inertia weight which somehow triggers an output, usually a mechanical output, when the inertia weight moves with respect to the remainder of the mechanics of the sensor causing the mechanical output to move in a particular direction.

EP0775317 discloses a multi-directional acceleration sensor which provides a mechanical output along an axis, i.e. the mechanical output of the sensor is provided in a particular direction. Since the mechanical output comprises a mechanical element moving in a particular direction, along a particular axis, that element itself will experience acceleration or deceleration along that axis. The acceleration experienced by the mechanical element effecting the mechanical output inevitably leads to the overall mechanism being more sensitive or less sensitive to accelerations or decelerations along the axis of the mechanical output. For example, if the mechanical output is along the x-axis and the sensor experiences a violent deceleration along the x-axis, then the mechanical element providing the mechanical output along the x-axis will experience that deceleration as well as the inertia weight thereby making the sensor more sensitive to decelerations along that x-axis. If an acceleration along the x-axis is provided in the opposite direction to which the mechanical element must move to provide its output, then it will be apparent that the sensor is less sensitive to such an acceleration. Such an acceleration sensor cannot therefore be regarded as truly omni-directional where the output is provided along a particular axis or in a particular direction.

This potential insensitivity or over-sensitivity to acceleration in a particular direction is called a "cross-talk" error for ease of reference. Cross-talk error occurs when an acceleration or a component of acceleration along a particular axis is aligned with a linear movement of a mechanical element in the trip mechanism or output mechanism of the acceleration sensor.

It is an object of the present invention to seek to provide an acceleration sensor which is omni-directional and which is not reliant on a mechanical output being provided along a particular axis.

SUMMARY OF THE INVENTION

Accordingly, one aspect of the present invention provides a holding mechanism for a vehicular acceleration sensor, comprising: a pair of lever arms operable to move independently of one another; and an inertia weight held between the lever arms, wherein movement of the inertia weight, in use, when under acceleration, causes at least a part of at least one lever arm or both arms to move in a generally linear direction.

Preferably, movement of the inertia weight, held between the lever arms, when under acceleration, causes one or both arms to move in a plane.

Conveniently, the pair of lever arms each has a cup portion, which cup portions face one another and hold the inertia weight therebetween.

Advantageously, the cup portions have substantially conical internal surfaces.

Preferably, the inertia weight comprises a ball.

Conveniently, the inertia weight comprises a non-spherical shaped ball, having one axis of rotational symmetry.

Advantageously, the inertia weight comprises a ball with an equatorial bulge.

Preferably, the inertia weight comprises a ball with a pair of opposed substantially conical protrusions.

The present invention further provides an acceleration sensor comprising:

a holding mechanism according to the present invention;

a trip mechanism to convert linear movement of a part of the holding mechanism into a rotational movement of the trip mechanism, which rotational movement comprises an output of the sensor.

Preferably, the trip mechanism has an axis of rotation and the holding mechanism is movable in a plane, the axis of rotation lying in the plane.

Conveniently, the extent of rotational movement is indicative of an acceleration experienced by the inertia weight.

Advantageously, the trip mechanism has a centre of gravity which lies substantially in the axis of rotation.

Preferably, the acceleration sensor is an omni-directional acceleration sensor, to provide an output in response to an acceleration of the inertia weight in any direction.

The present invention further provides an inertia reel comprising:

an acceleration sensor according to the present invention; and a spool

Preferably, at least a part of the sensor is housed in a part of the spool.

Conveniently, the majority of the sensor is housed in the spool.

Advantageously, the reel also includes a strap acceleration sensor and the acceleration sensor is at least partly housed in the strap acceleration sensor.

Preferably, the rotational movement trips a trigger to cause locking of the spool.

Conveniently, the trip mechanism is rotatably mounted to a cam mechanism which holds the trigger.

Advantageously, the trip mechanism is biased into a position by an elastic member interacting between the cam mechanism and the trip mechanism, the biasing force exerted by the elastic member being overcome by rotation of the trip mechanism under vehicular acceleration above a predetermined threshold.

Preferably, the inertia reel further comprises a strap acceleration sensor.

Conveniently, the inertia reel has a common trigger tripped by actuation of either the vehicular acceleration sensor or the strap acceleration sensor.

The present invention further provides an acceleration sensor comprising an inertia weight located toward one end of a lever arm which is movable in a generally linear direction in response to movement of the inertia weight, movement of the inertia weight or a part of the lever arm adjacent the inertia weight in a generally linear direction being converted to a rotational movement of a trip mechanism as an output of the sensor.

The present invention further provides an acceleration sensor having an inertia weight and a rotational output, wherein the axis of rotation substantially passes through the inertia weight.

The present invention further provides a method of sensing a vehicular acceleration above a predetermined threshold comprising:

holding an inertia weight movable under acceleration;

translating movement of the inertia weight into a substantially linear movement; and converting the substantially linear movement into a rotational movement of a trip mechanism, wherein the extent of rotational movement is indicative of an acceleration experienced by the inertia weight.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Referring to the figures, an acceleration sensor embodying the present invention will be described in the context of an inertia reel for a seat, the acceleration sensor embodying the present invention sensing vehicle acceleration or deceleration and providing an output in response to the acceleration or deceleration exceeding a threshold acceleration/deceleration. The inertia reel senses vehicle acceleration and the output triggers a mechanism to brake the reel and stop any further strap from being paid out by the inertia reel spool. The inertia reel also includes a separate strap acceleration sensor to brake the spool when the strap wound around the spool undergoes a strap acceleration above a pre-determined threshold.

Figure 1:
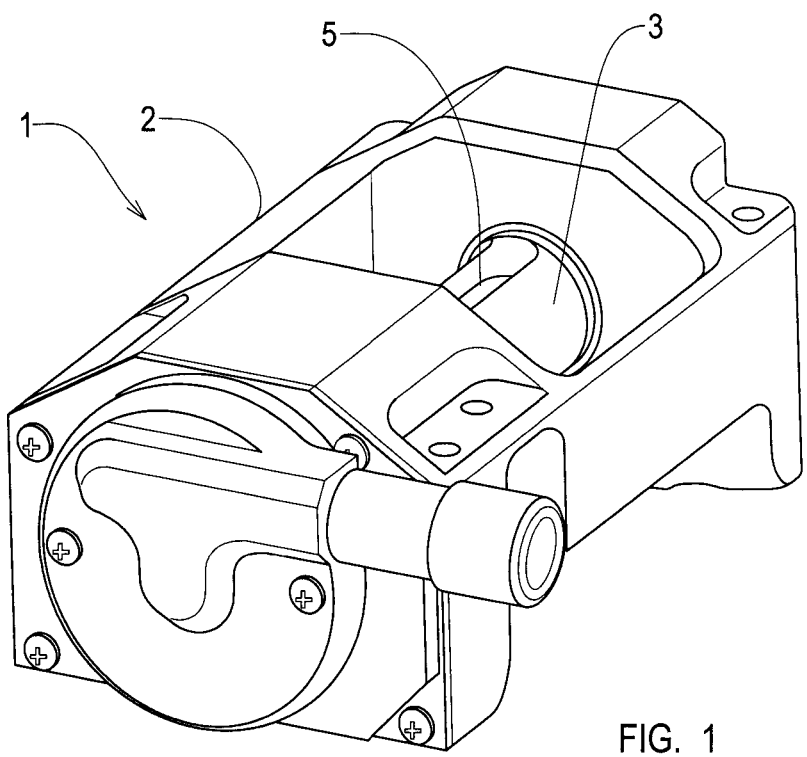
FIG. 1 is a perspective view of an inertia reel incorporating a sensor embodying the present invention.

Referring now to FIG. 1, the inertia reel 1, comprises a main body 2, for accommodating a spool 3 and the sensor arrangements discussed below. A webbing strap (not shown) is intended to be inserted in a slot 5 in the spool 3 and wound around the spool 3. Usually, more than one inertia reel will be used on each seat so that the webbing straps combine to form a harness arrangement for the occupant of the seat.

Figure 2:
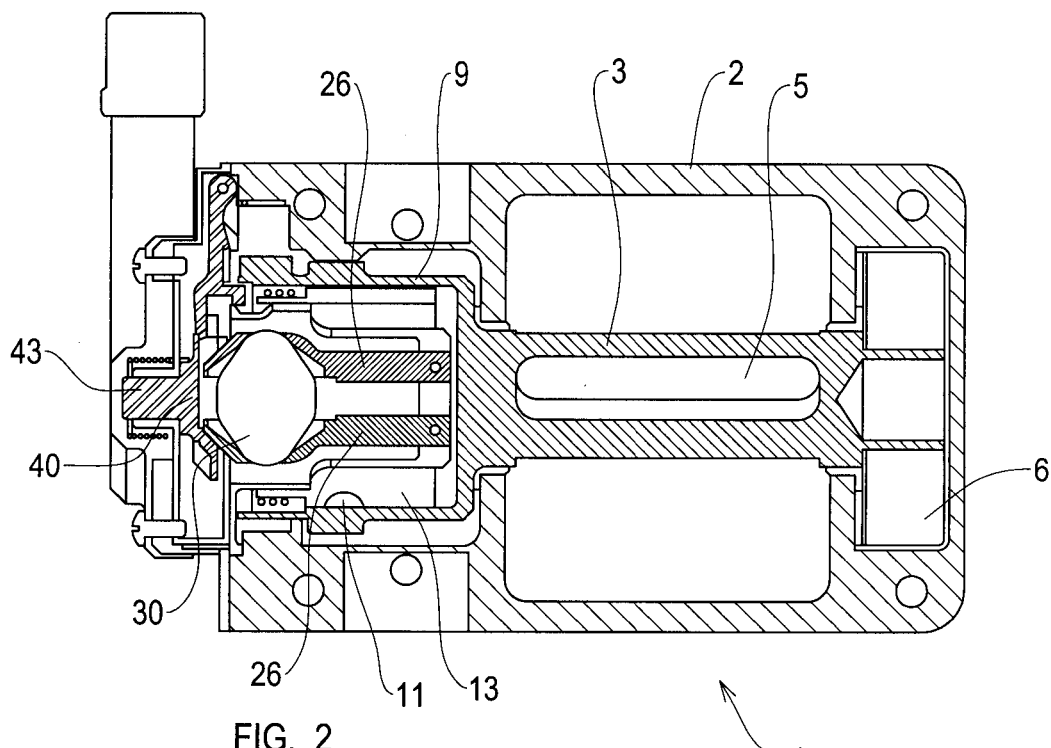
FIG. 2 is a cross section through the inertia reel of FIG. 1.
Figure 3:
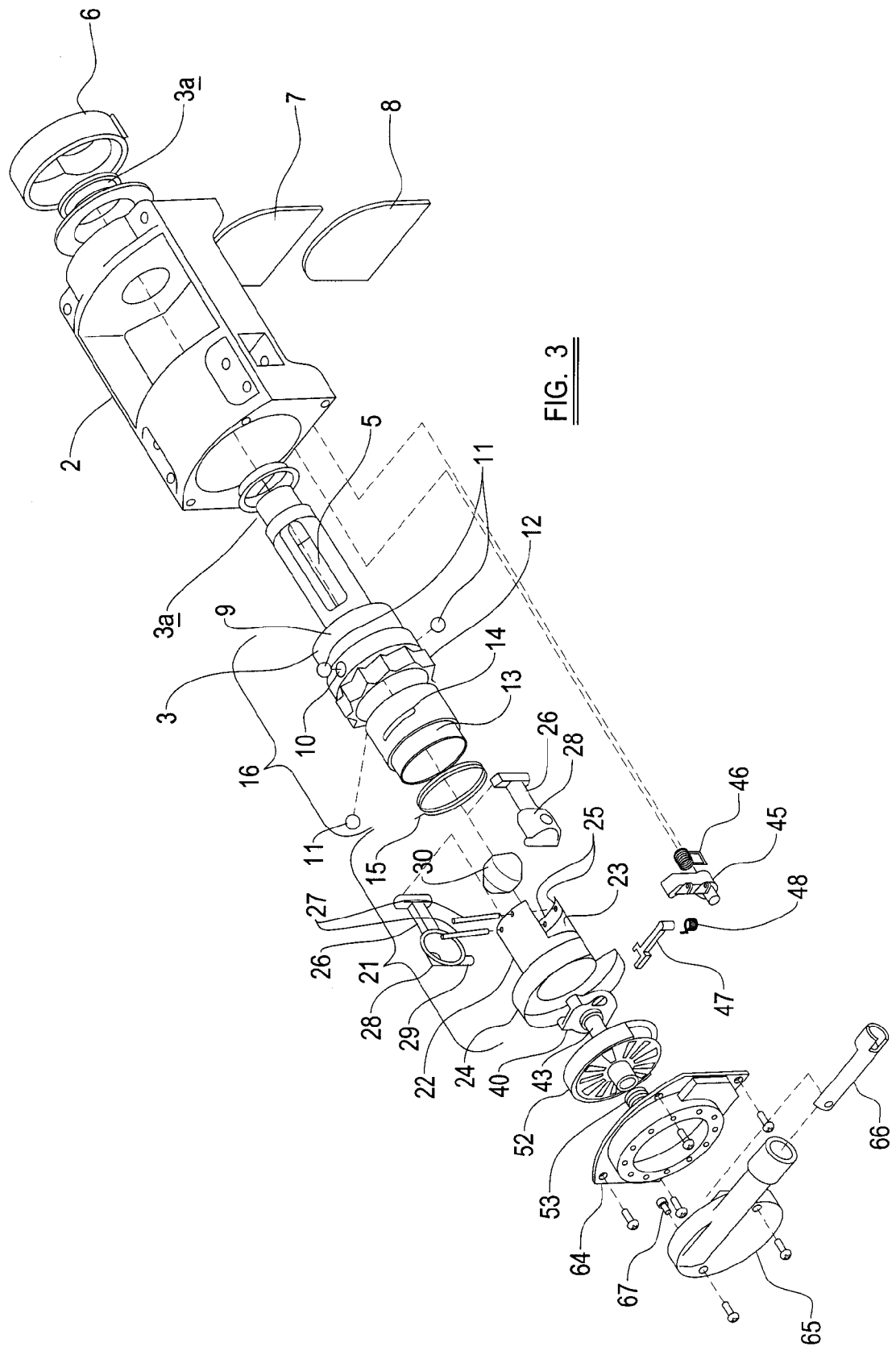
FIG. 3 is an exploded view of the inertia reel of FIG. 1.

Referring now to FIGS. 2 and 3, the spool 3 is inserted in the body 2 and journalled thereto by bearings 3A at either end. One end of the spool 3 engages a torsion spring 6 held within the body 2 in a cut-out formed at one end of the spool 3. The torsion spring 6 serves to bias the spool to retract the webbing strap wound around the spool 3. The torsion spring 6 is held within the body by a capping seal 7 and a cover 8.

Figure 4:
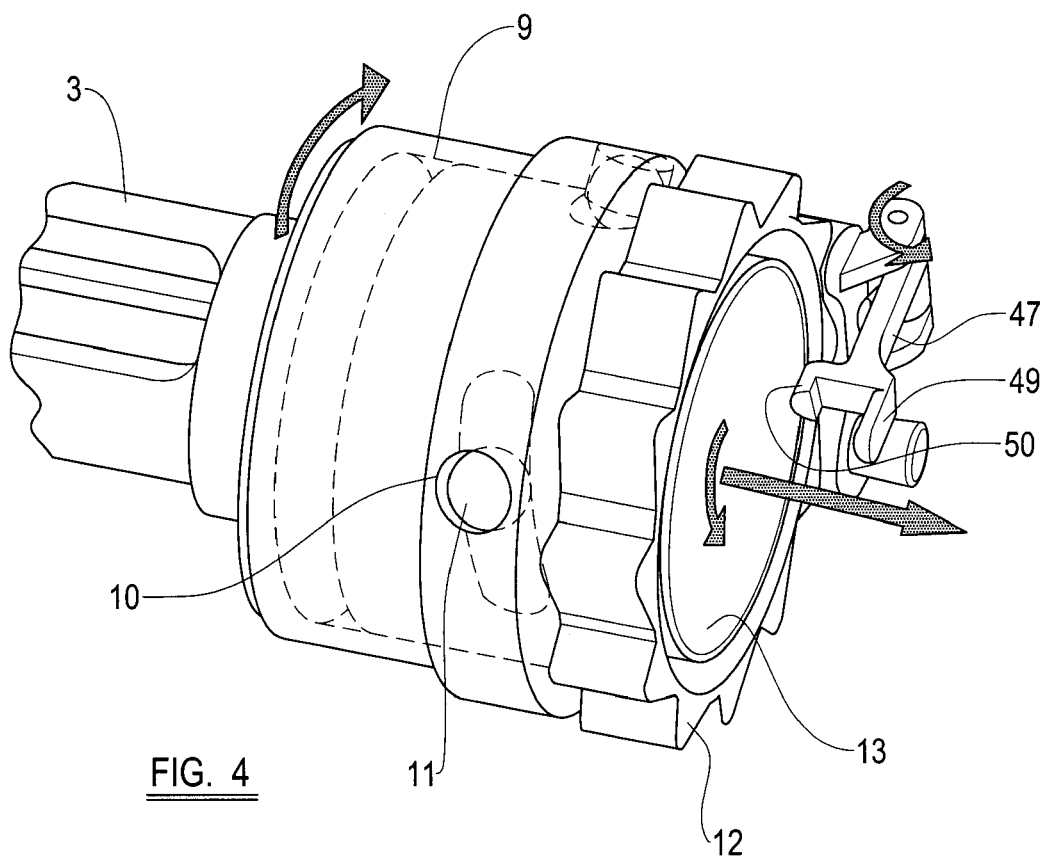
FIG. 4 is a partial perspective view of a strap acceleration sub-assembly for use with the reel of FIG. 1.

Turning now to FIG. 4, the other end of the spool 3 terminates in a cylindrical wall 9 in which are provided three equispaced holes 10, in each of which sits a respective ball bearing 11, for engaging with a cylindrical sleeve sitting coaxially inside the cylindrical wall 9. The cylindrical wall 9 of the spool 3 has a free edge into which are machined a variety of circumferentially arranged outwardly projecting teeth having rounded edges which form a ratchet wheel 12.

A cylindrical inertia weight 13 (comprising the aforementioned cylindrical sleeve), sits within the cylindrical wall 9, and is machined with three equispaced helically shaped grooves 14 in its outer surface which each, together with a corresponding hole 10, hold the ball bearings 11. Another torsion spring 15 sits around the inertia weight 13 and biases the inertia weight 13 with respect to the cylindrical wall 9 of the spool 3 from relative movement so that the inertia weight 13 is urged axially inside the cylindrical wall 9. It is the torsion force of the torsion spring 15 which the inertia weight 13 must overcome when under strap acceleration and it is thus the torsion spring 15 which, inter alia, determines the threshold strap acceleration which will cause braking of the spool 3. Under excessive strap acceleration (significant enough to overcome the predetermined strength of the torsion spring 15), the inertial weight 13 dwells with respect to the spool 3. The inertia weight 13 rotates with respect to the spool 3 and the ball bearings 11 (seated between the helical grooves 14 and the holes 10 in the cylindrical wall 9) drive the inertia weight 13 axially outwardly of the cylindrical wall 9 so as to close a gap between the inertia weight and a trigger which is to be described later. At the trigger, the axial movement of the inertia weight 13 with respect to the cylindrical wall 9 pushes the trigger thereby actuating a pawl to engage with the ratchet wheel 12.

The aforementioned elements comprise the spool sub-assembly 16 and are all located within the body 2 of the reel 1, with the exception of the central part of the spool 3 and the strap webbing which are necessarily exposed.

Figure 5:
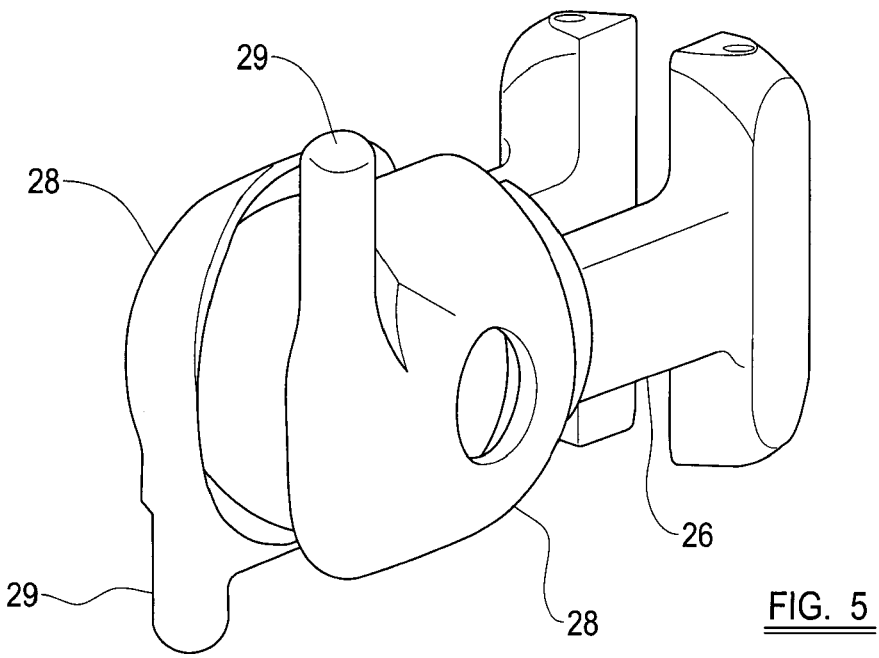
FIG. 5 is a perspective view of a sub-assembly of an acceleration sensor embodying the present invention.

Referring to FIGS. 2, 3 and 5, a vehicle acceleration sensor sub-assembly 21 is provided which at least partially sits within the cylindrical inertia weight 13. The sensor sub-assembly 21 comprises a carriage 22 which has a first part that comprises a pair of curved spaced-apart side walls 23 adapted to be inserted in the cylindrical inertia weight 13 and a second part comprising a cylindrical shroud 24 of greater diameter than the first part to shroud partially a cam plate. The shroud 24 is provided with a cut-away to allow a trigger mechanism access to parts of the sensor sub-assembly 21.

The end of each of the spaced-apart side walls 23 carries a pair of locating holes 25.

The sensor sub-assembly 21 comprises a pair of independent lever arms 26 which are identical to one another and which are each fixed at one end by a pivot pin 27 within and to the carriage 22, the pins 27 sitting in the locating holes 25. Referring to FIGS. 3 and 5, each arm 26 is T-shaped and is provided with a hemispherical cup 28, at the base of the T. The cross-member or bar of each T-shaped arm 26 accommodates a respective one of the pivot pins in a through hole along its length. Thus, each lever arm 26 is pivotally mounted to the carriage 22 at one end and defines a hemispherical cup 28 at the opposite end, the cup end. The arms 26 are thus free to pivot in a common plane normal to the pins 27 by a small angular amount (between)3-10°). Although each arm 26 rotates around an axis defined by a respective pin 27, the dimensions of the arm 26 and the extent of travel of the cup, in use, are such that the cup prescribes a substantially linear motion.

Each hemispherical cup 28 carries a small tongue 29, which projects from the convex surface of the hemispherical cup 28 in a direction parallel to the bar of the T and the pivot pins 27.

The two lever arms 26 are presented to one another with the concave surfaces of the cups 28 facing one another so as to define a substantially spherical cavity into which is placed a spherical inertia weight which is termed herein, for the sake of easy reference, a G weight 30 so as to distinguish it from the cylindrical inertia weight 13 responsible for strap acceleration sensing. The G weight 30 is responsible for vehicle acceleration sensing. The cups 28 hold the G weight in the sensor sub-assembly 21.

When pivotally mounted in the carriage 22, the lever arms 26 are able to move independently of one another in their common plane constrained by the axes of the pivot pins 27 under influence of movement of the G weight 30, in response to vehicle acceleration or deceleration. The inertia weight of the G weight is intentionally substantially greater than that of the other component parts of the sensor sub assembly 21.

The carriage 22, constrains movement of the lever arms 26, such that they cannot move apart to the extent that the G weight 30 would fall out of the cups 28—i.e. the distance between the cups 28 is never greater than the diameter of the G weight ball 30.

Figure 6:
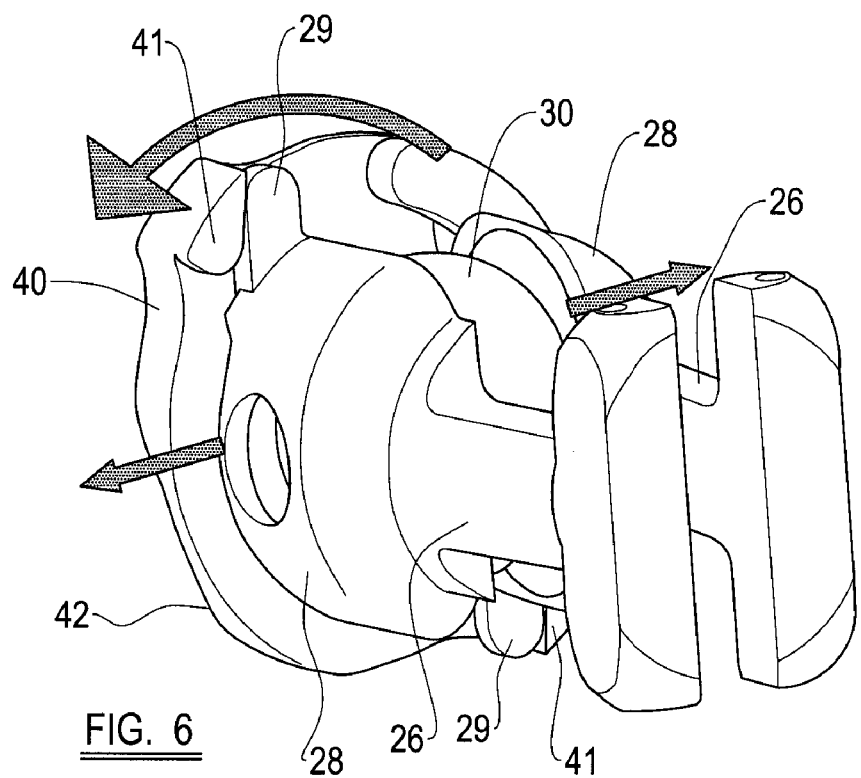
FIG. 6 is a perspective view of the sub-assembly of FIG. 3 together with a trip plate.

Referring now to FIG. 6, with the lever arms 26 mounted in the carriage 22, the cup ends of the lever arms 26 are capped with a circular trip plate 40. The trip plate 40 carries a pair of diametrically opposed tabs 41 which are each located to engage a respective tongue 29 of the hemispherical cups 28. The trip plate 40 also has ramped side walls 42 on opposite sides of its periphery and a centrally mounted post 43 (best seen in FIGS. 2, 3 and 7) projecting in the same direction as the ramped side walls. The trip plate 40 is rotatably mounted with respect to a cam plate to be described later, and is thus rotatably mounted with respect to the body 2.

It will be appreciated from FIG. 6 that movement of the G weight ball 30 in any direction will cause either one or both of the independent lever arms 26 to pivot about their axes and cause at least one of the lever arms 26 to move outwardly, thereby engaging the tongue 29 with the tab 41 and converting the substantially linear motion of the lever arm 26 at the cup end into a rotational motion of the trip plate about the central axis of the post 43 and the extent of rotation is indicative of the acceleration experienced by the inertia weight.

In FIG. 6, the two straight direction arrows show the cup ends of the lever arms 26 both moving substantially in a linear direction outwardly with respect to one another so that the tongues 29 both engage with the tabs 41 and convert the linear motion into rotational motion of the trip plate 40 (shown by the curved rotation arrow). The function of the ramped side walls 42 will be explained later. It is, however, important to note that under vehicular acceleration, the G weight ball 30 has substantially more inertia than the remainder of the sensor sub-assembly 21 and therefore dwells relative to the other components causing relative linear movement between the G-weight 30 and the levers 26. It is this linear relative movement which the combination of the tongues 29 and tabs 41 convert into rotational motion of the trip plate 40. It should be noted that the tongues 29 are placed outboard of the cups 28 so as to create as large a moment arm as possible to act upon the tabs 41 of the trip plate 40.

The trip plate 40 offers a rotational mechanical output of the sensor sub-assembly 21, which rotational output is not affected in its sensitivity to the direction of the acceleration experienced by the G weight 30. Thus, the rotational output is not sensitive to the direction of acceleration and the sensor sub-assembly 21 can be regarded as a truly omni-directional acceleration sensor. Importantly, the extent of rotation is indicative of the acceleration experienced by the inertia weight yet remains insensitive to the direction of acceleration.

Figure 7:
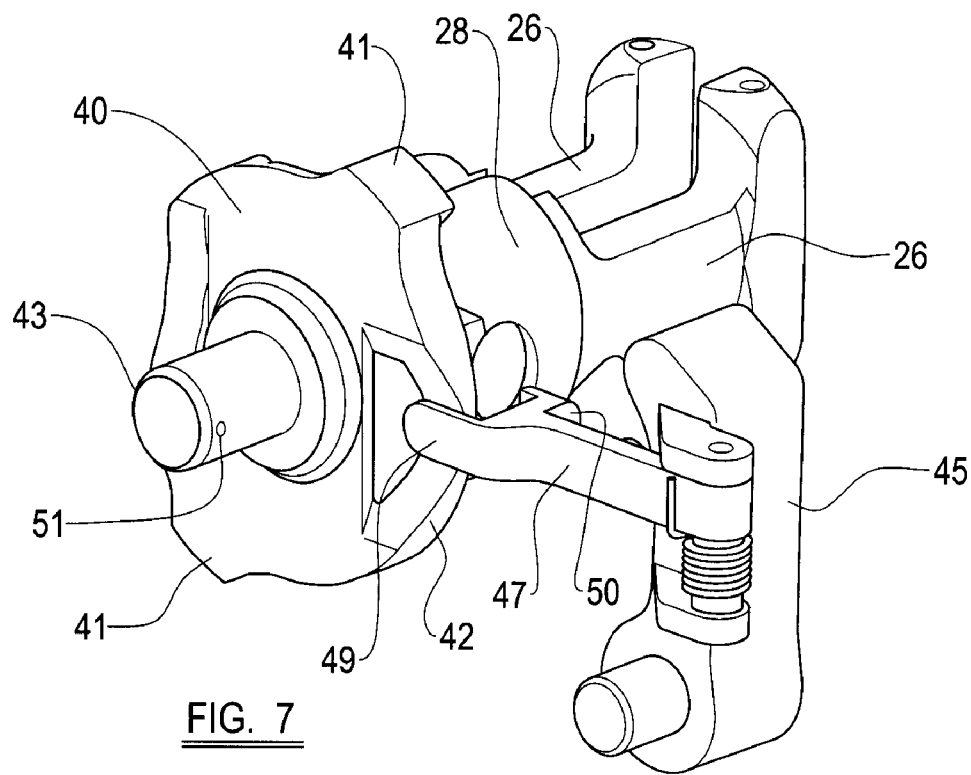
FIGS. 7, 8 and 9 are perspective views showing the operation of the trip plate of FIG. 6.
Figure 8:
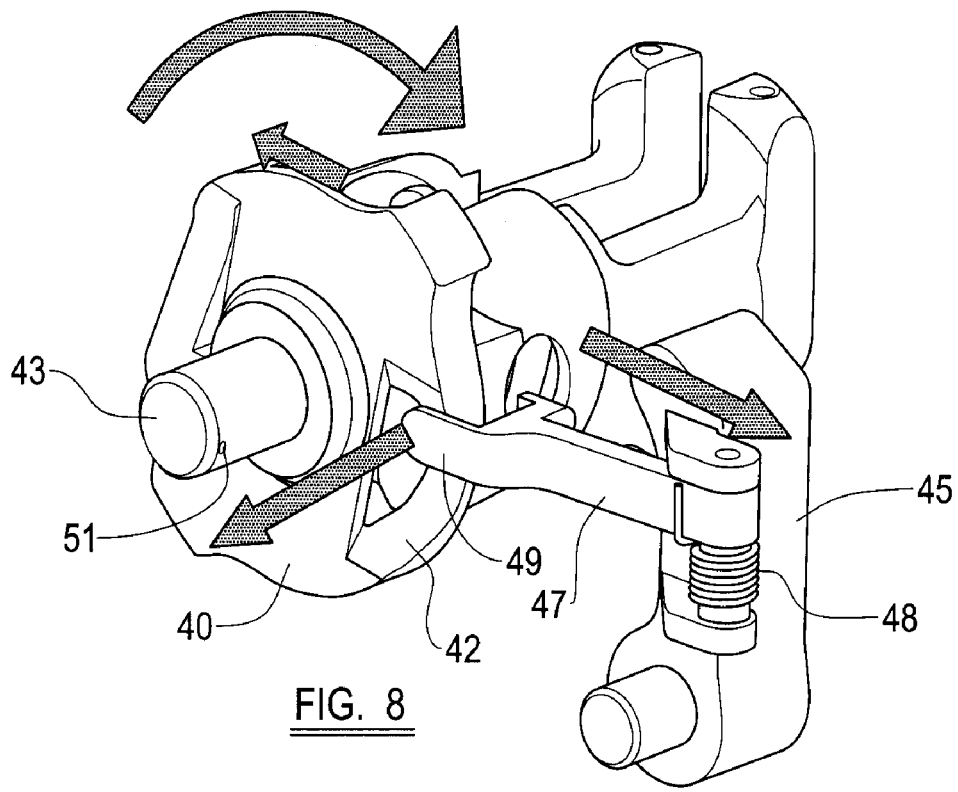
Figure 9:
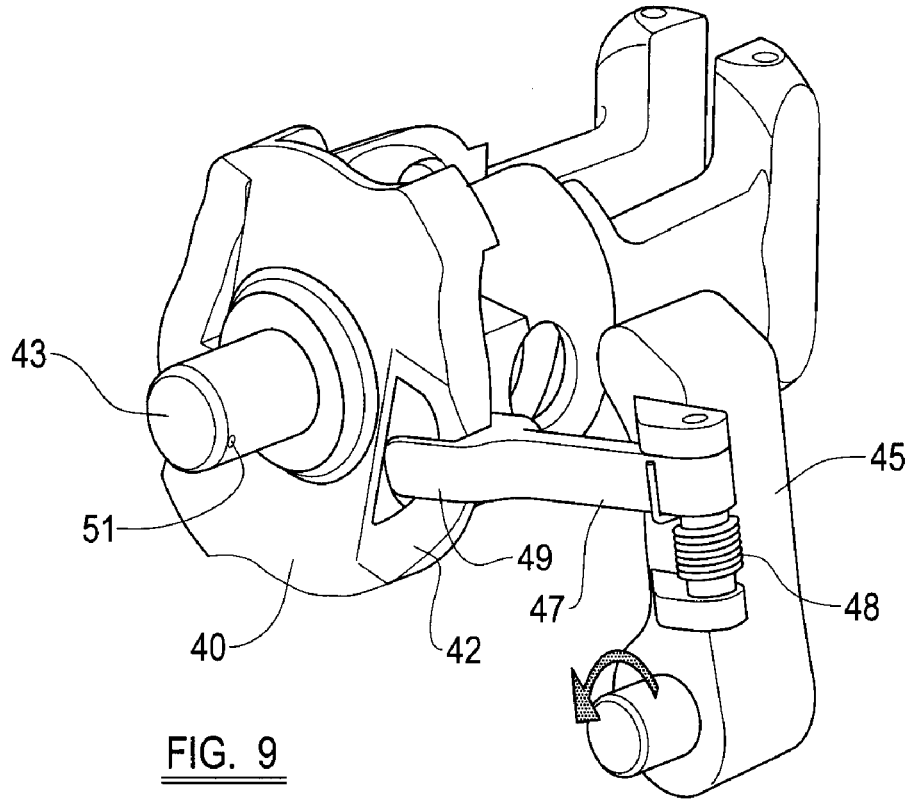

FIGS. 7, 8 and 9 show how the mechanical rotational output of the trip plate 40 is used to trigger braking or locking of the spool. A locking pawl 45 is hingedly mounted to the body 2 and a torsion spring 46 is fixed to the pawl 45 to bias the pawl 45 toward the adjacent ratchet wheel 12. The pawl 45 is held off from engaging with the ratchet wheel 12 by a trigger in the form of a trigger finger 47 which is pivotally mounted to and extends from the pawl 45. A further torsion spring 48 biases the trigger finger 47 in one direction.

The trigger finger 47 terminates at its tip in a bifurcated portion, each portion comprising a contact pad 49, 50, each responsive to a respective trigger input. The first contact pad 49 rests upon a ramped side wall 42 of the trip plate 40 and is biased by the torsion spring 48 toward the ramped side wall 42. In the normal reset condition shown in FIG. 7, the first contact pad 49 sits at the bottom of the ramped side wall 42. The contact pads 49, 50 can be best seen in FIGS. 11, 12A and 13A.

When vehicular acceleration exceeds the predetermined threshold, the trip plate 40 rotates causing the first contact pad 49 to rise up the ramped side wall 42 rotating underneath it as seen in FIG. 8. The spring-loaded trigger finger 47 is also being held in engagement with a cam plate 52 to which the trip plate 40 is rotatably mounted by another torsion spring 53 which passes through a securing hole 51 in the centrally mounted post 43.

Figure 10:
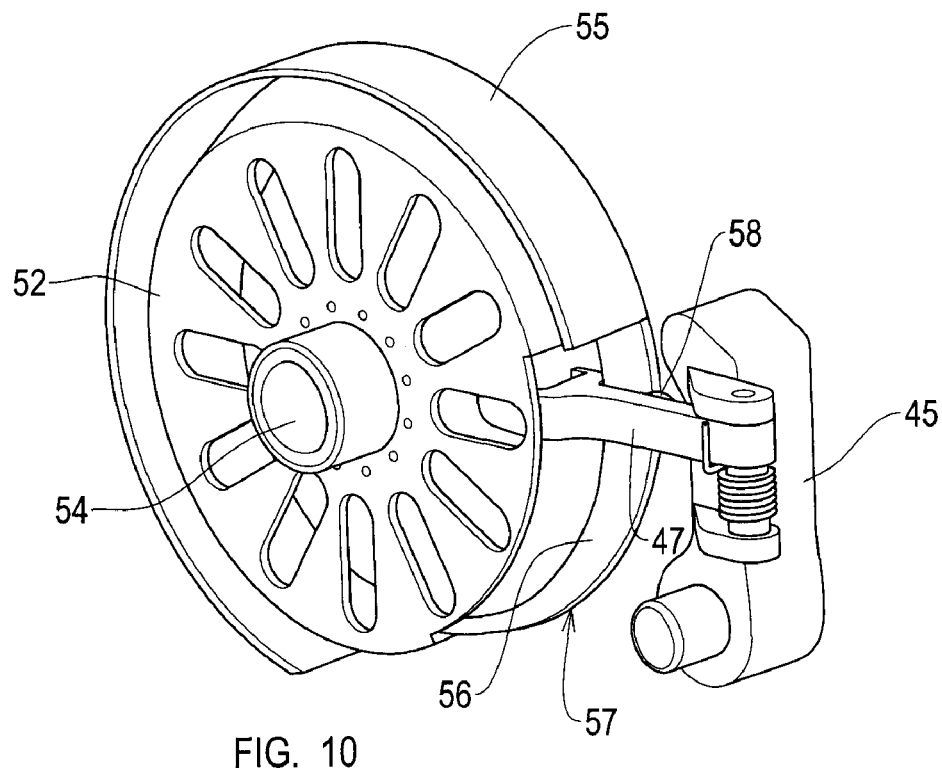
FIGS. 10 and 11 show detail of a cam plate, pawl and trigger for use with the acceleration sensor embodying the present invention.
Figure 11:
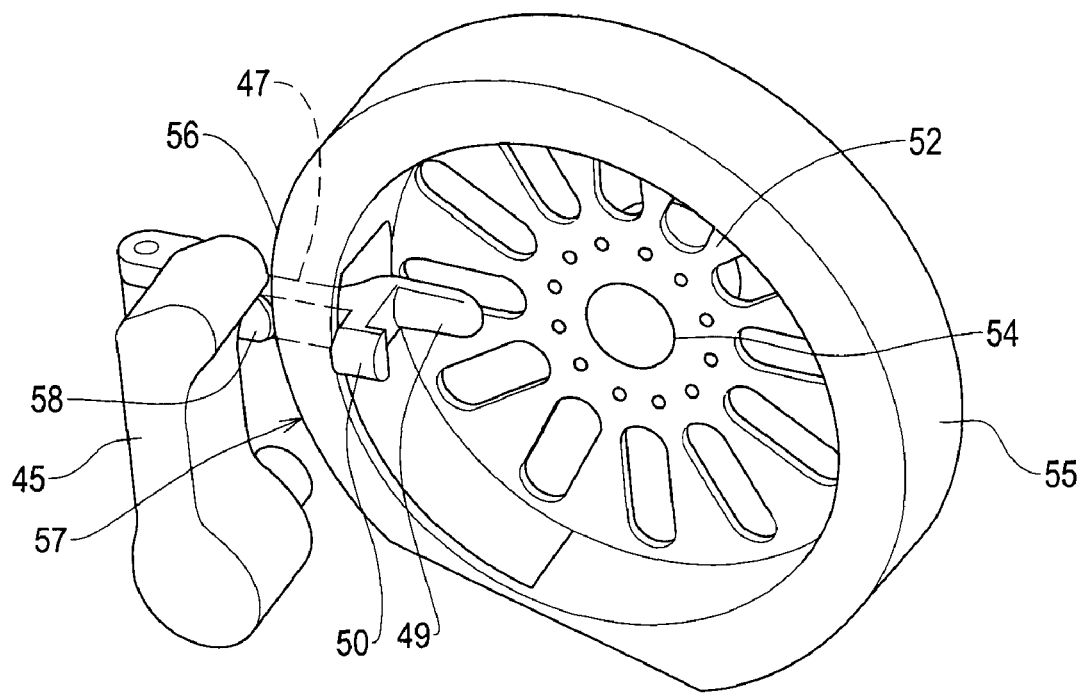
Figure 12A:
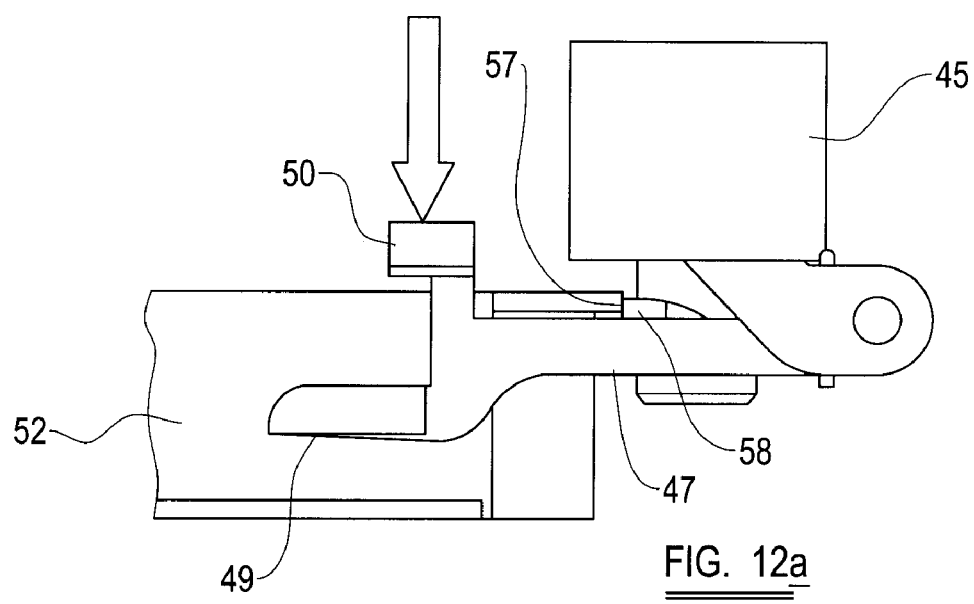
FIGS. 12A and 12B show the cam plate, pawl and trigger of FIGS. 10 and 11 when reset, prior to triggering.
Figure 12B:
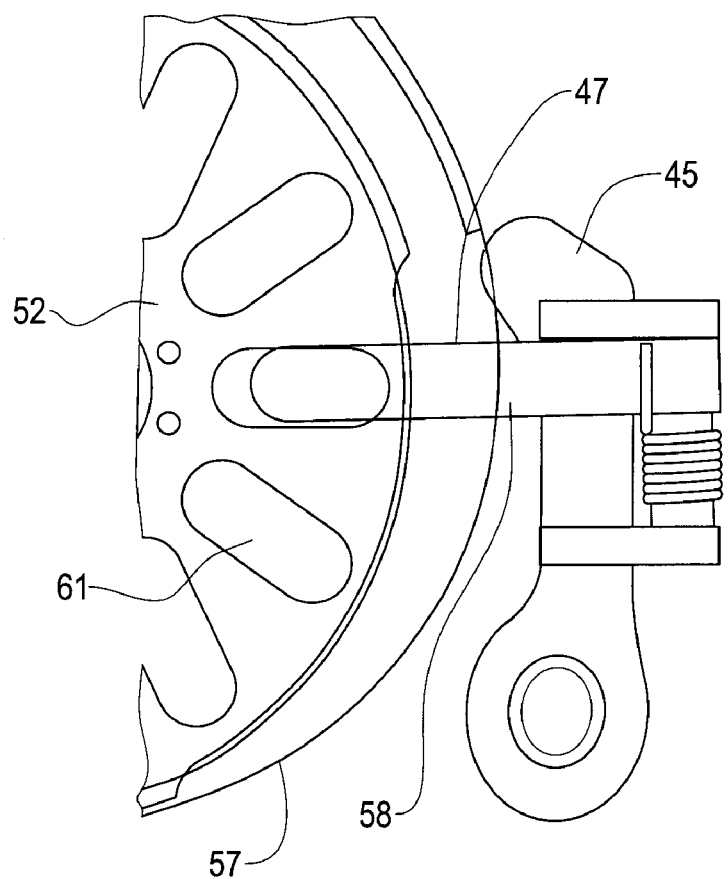

Referring now to FIGS. 10 and 11, the cam plate 52 is a circular disc having a central hollow sleeve 54 projecting in one direction and an outer cylindrical side wall 55 projecting in the opposite direction. The side wall 55 has about a quarter thereof cut away and supports an annular flange 56 along its outer edge remote from the disc. The annular flange lies parallel to the disc but presents a cam edge 57 having a radius from the central axis of the cam plate 52.

The trigger finger 47 has, toward the base of the finger, a small shoulder 58 sitting proud from the trigger finger, and it is this shoulder 58 which engages with a cam edge 57 of the cam plate 52 and which prevents the pawl 45 from engaging the ratchet wheel 12 (see FIGS. 7, 10, 11, 12A and 12B). Movement of the first contact pad 49 of the trigger finger 47 up the ramped side wall 42 causes the shoulder 58 to lift off from the cam edge 57 and allows the pawl to be spring biased by the torsion spring 46 into engagement with the ratchet wheel 12.

The secondary portion of the trigger finger 47 was mentioned earlier with respect to the spool sub-assembly 16, in particular, the inertia weight 13 which moves axially outwardly from the confines of the cylindrical wall 9 of the spool 3 upon excessive strap acceleration so as to close a gap between the inertia weight 13 and the trigger finger 47. It is this secondary portion of the trigger, the second contact pad 50, which is normally spaced apart from the inertia weight 13 which, upon excessive strap acceleration, is approached as the dwell weight closes the gap (see FIG. 4) and, at the predetermined strap acceleration threshold, contacts the second contact pad 50 (see FIG. 13A) and urges the trigger finger 47 against the restoration force of the torsion spring 48 and lifts the shoulder 58 off from the cam edge 57 again causing engagement of the pawl with the ratchet wheel 12. This arrangement of the shoulder 58 initially resting on the cam edge 57 of the cam plate is best seen in FIGS. 10, 11, 12A and 12B.

As previously mentioned, the trip plate 40 is rotatably spring loaded with respect to the cam plate 52, by a torsion spring 53 and it is the strength of the torsion spring linking the two items which determines the predetermined acceleration threshold.

Referring to FIGS. 10, 11, 14 and 15, the disc of the cam plate 52 is provided with a series of equispaced radially extending slots 61 and the centrally mounted sleeve 54 is dimensioned to receive and journal the centrally mounted post of the trip plate 40. The torsion spring 53 is placed over and around the sleeve 54 with one end of the torsion spring 53 being fixed in a hole provided in the cam plate 52 and the other end of the torsion spring passing through the securing hole 51 (see FIGS. 7, 14 and 15) formed in one end of the centrally mounted post 43.

Figure 13A:
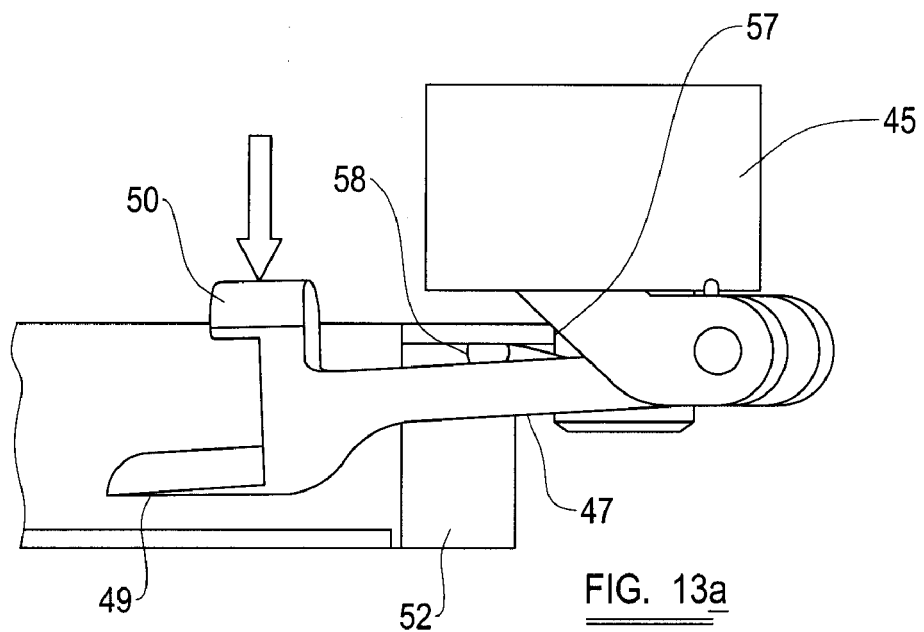
FIGS. 13A and 13B show the cam plate, pawl and trigger of FIGS. 10 and 11 after triggering.
Figure 13B:
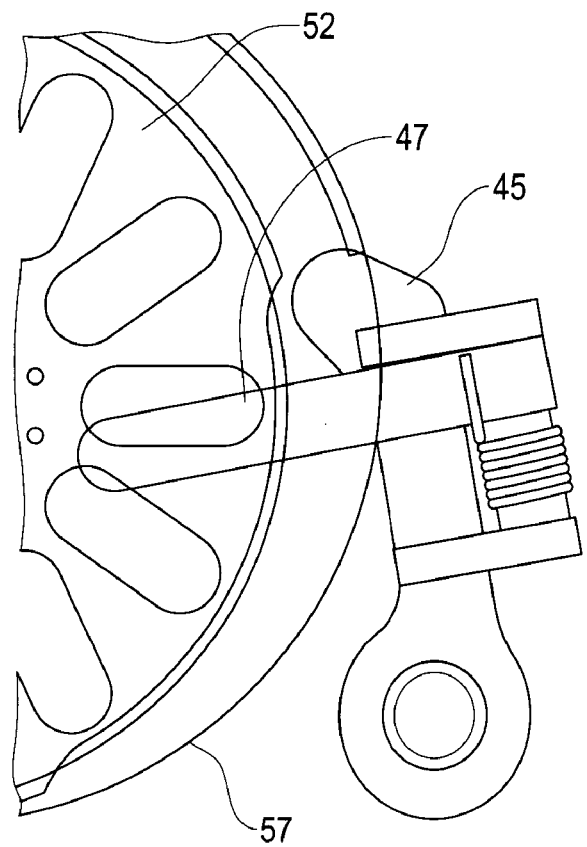
Figure 14:
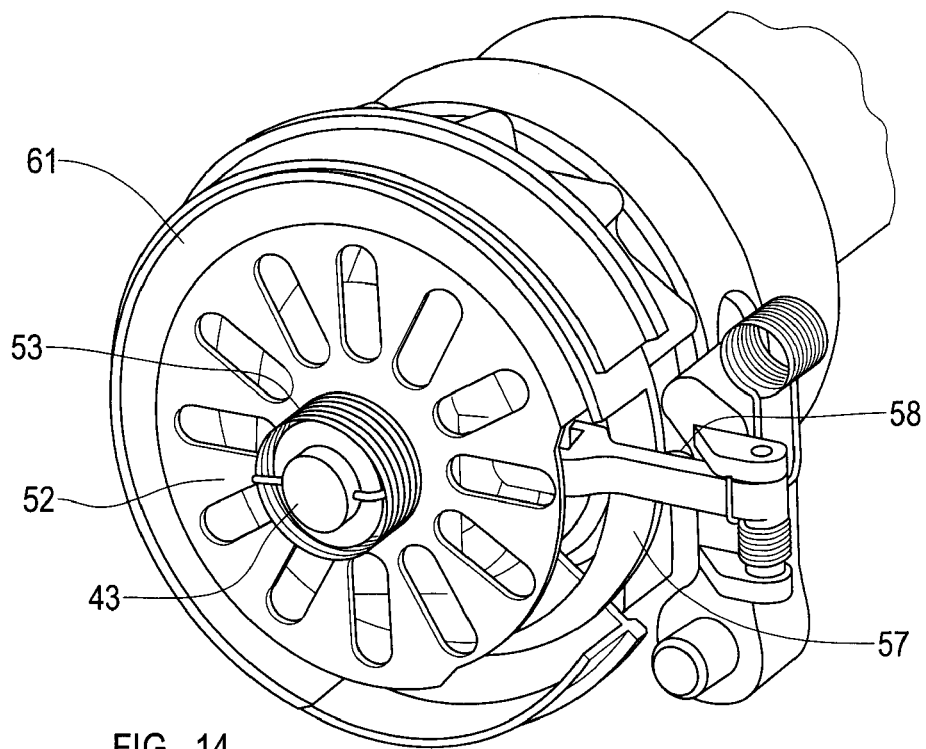
FIGS. 14 and 15 show manual operation of the cam plate of FIGS. 10 and 11.
Figure 15:
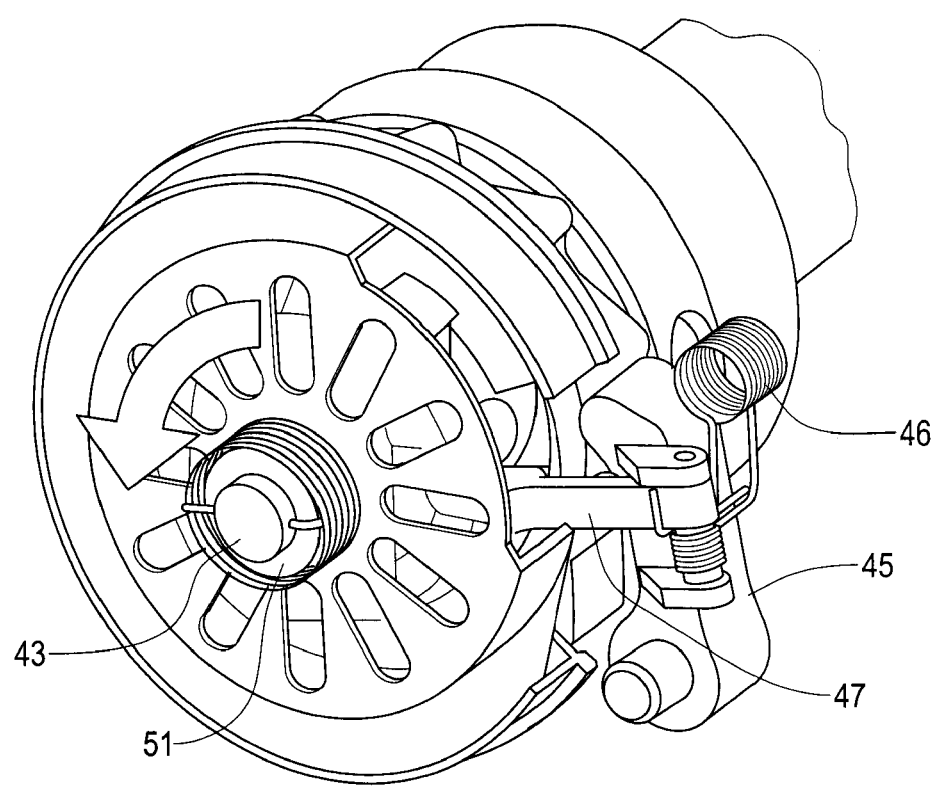

Referring to FIGS. 2 and 3, an end plate 64 fixes over all this sub-assembly to close that end of the body 2, but the radially extending slots 61 in the cam plate 52 are still exposed through the end plate 64. A slide housing 65 holding a cable slide 66 is fixed to the end plate 64 and an actuating pin 67 extends from the slide housing 65 into one of the radial slots 61 in the cam plate 52. The actuating pin 67 can be moved by activation of the cable slide 66 to rotate the cam plate through in the region of 90° by a stroke in the region of 0.7"—typically affected by a lockable lever. In the normal operating condition as shown in FIG. 14, the widest part of the cam edge 57 is presented to the shoulder 58 on the trigger finger 47 thereby holding off the pawl 45 from engagement with the ratchet wheel 12. Referring to FIGS. 14 and 15, a counter clockwise rotation of 90° moves the cam edge 57 presented to the shoulder 58 from its thickest part to its thinnest part thereby allowing the shoulder 58 to move radially inwardly under the biasing of the torsion spring 46 and to eventually allow engagement of the pawl 45 in the ratchet wheel 12. This is manual locking of the spool 3. It will be appreciated that manually locking the spool 3 does not involve knocking the shoulder 58 off the cam edge 57 (as shown in FIGS. 13A and 13B).

It should be noted that if the trigger finger 47 had been triggered by either the vehicle acceleration sensor or the strap acceleration sensor, then the shoulder 58 would have been knocked off from engagement with the cam edge 57 of the cam plate 52 and the pawl 45 engaged with the ratchet wheel 12. To reset the system, the cam plate 52 needs to be rotated by actuating the cable slide 66 so as to move the cam edge 57 from presenting its thickest part to the shoulder 58 to the point at which the cam edge 57 presents its thinnest part, which is radially inward of the thinner part and, importantly, also radially inward of the surface of the shoulder 58 presented to the cam edge 57 when the pawl 45 is engaged in the ratchet 12. The trigger finger 47 is spring-loaded and thus, when the thinnest part of the cam edge 57 is adjacent the shoulder 58, the trigger finger 47 is able to swing back towards the pawl 45 and the shoulder rests again adjacent the cam edge 57 (the situation in FIG. 15). Counter rotation of the cam plate 52 in the clockwise direction (starting from the position shown in FIG. 15) presents an ever thickening portion of the cam edge 57 to the shoulder 58 driving the shoulder 58 and thence the trigger finger 47 radially outwardly thereby pulling the pawl 45 back from engagement with the ratchet wheel until the normal operating condition is achieved (the system has been reset) as shown in FIG. 14.

As well as providing the means for resetting the trigger mechanism, the ability to rotate the cam plate 52 by the cable slide 66 also provides for manual operation, i.e. manual locking, of the inertia reel as previously described.

Once again, it should be noted that the cam plate 52 only has rotary motion and is therefore insensitive to vehicle acceleration or vibration.

The above described inertia reel is omni-directional but advantages of the invention can still be appreciated where it is desired to make the vehicle acceleration sensor mechanism not reliant or not sensitive to a mechanical linear output in a particular direction. Thus, advantages of the invention can be conferred by physically attaching the G weight 30 to a lever arm 26 or making the G weight 30 part of a lever arm 26 and converting the substantially linear motion of the G weight into a rotational output which is itself independent of and not sensitive to vehicle acceleration but the extent of rotation is indicative of the acceleration experienced by the inertia weight.

In the above described embodiment the G weight comprises a spherical ball but it has been found that by modifying the shape of the ball and to some extent the conical surfaces making up the cups and the lever arms, an additional mechanical advantage can be obtained when the reaction force does not go through the centre of gravity of the G weight in the case of an off-axis acceleration.

Figure 17:
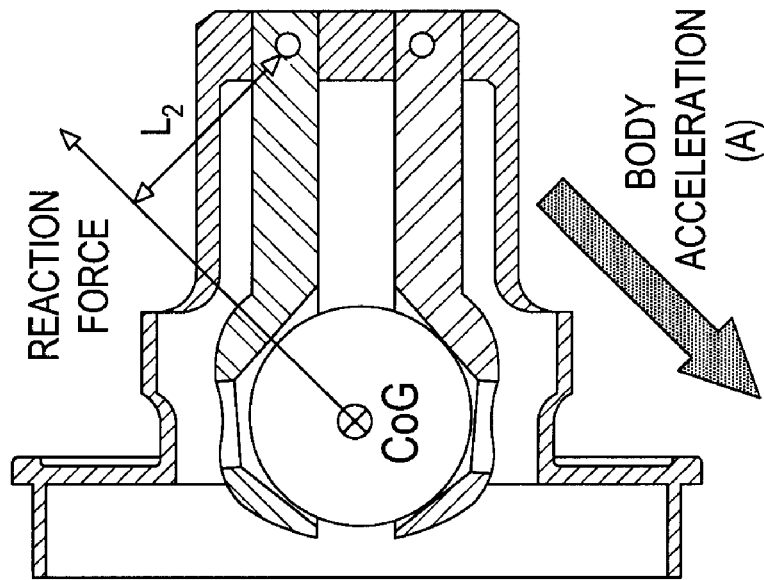
FIG. 17 is a cross-section through the sub-assembly of FIG. 16 when experiencing an off-axis acceleration.
Figure 16:
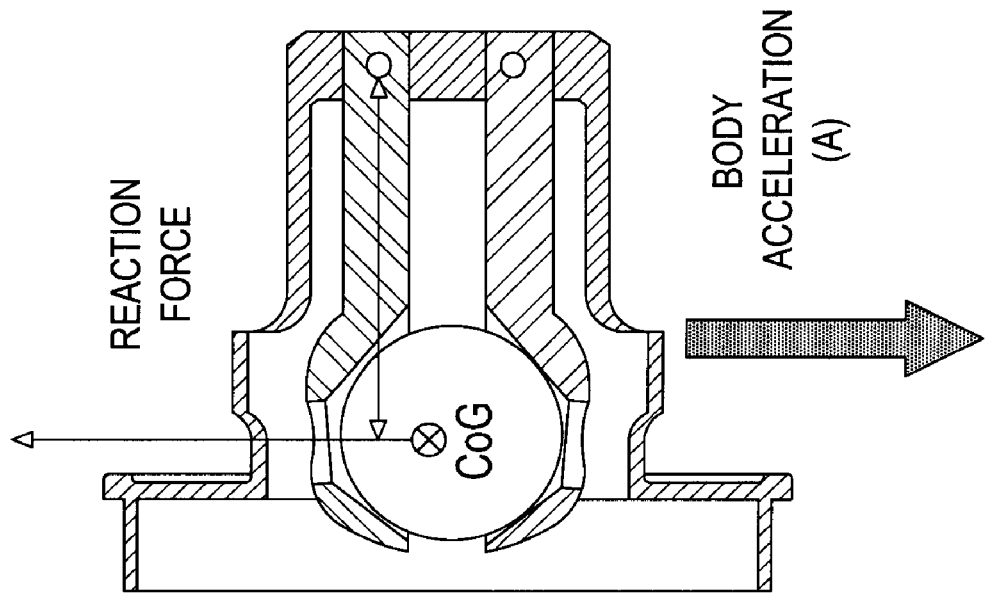
FIG. 16 is a cross-section through a sensor sub-assembly embodying the present invention experiencing an on-axis acceleration.

In the normal case with a spherical G weight 30, the moment on the cup is less when under off-axis acceleration than when experiencing an on-axis acceleration. For an on-axis acceleration (see FIG. 16), the moment on the cup is equal to mass of G weight*acceleration*L1, where L1 is the moment arm from the pivot pin of the lever arm to the centre of gravity of the G weight 30. When the acceleration is off-axis (see FIG. 17), then the moment arm is equal to the mass*acceleration*L2, where L2 is a component of the moment arm experienced under on-axis acceleration. Since the component of the moment arm L2 is less than the maximum moment arm L1, less moment is experienced by the cup, i.e. there is a reduced mechanical advantage.

Figure 19:
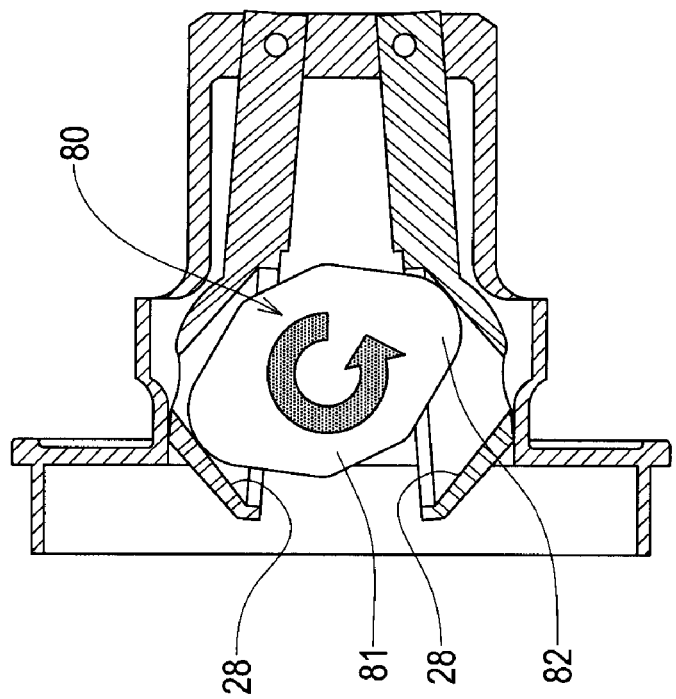
FIG. 19 is the sensor sub-assembly of FIG. 18 experiencing an off-axis acceleration.
Figure 18:
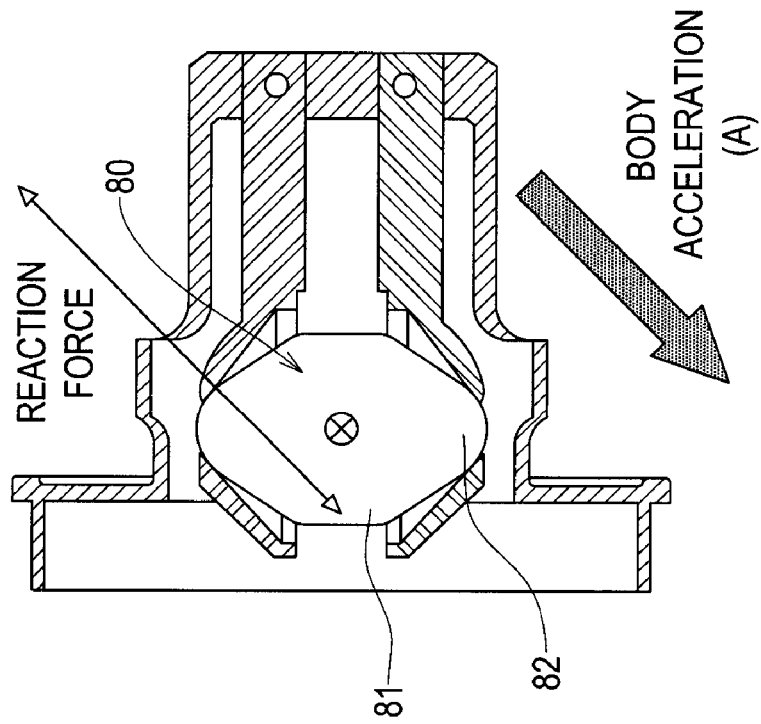
FIG. 18 is a sensor sub-assembly embodying another aspect of the present invention.

Referring now to FIGS. 18 and 19, another embodiment of the present invention utilises a shaped G weight 80 comprising a spherical ball 81 with a pair of opposed conical lobes 82 projecting from opposite sides of the ball. The conical lobes 82 are located and held in the cups and the modified G weight 80 works in exactly the same way as the spherical G weight 30 except when the sensor experiences an off-axis acceleration. Any off-axis acceleration creates a reaction force and the moment arm about the centre of gravity of the modified G weight 80 serves to rotate the G weight and cause the lobes 82 to press on the cups 28 and force the cups apart. This is contrasted with an off-axis acceleration experienced by a spherical G weight in which the spherical G weight 30 would freely rotate (that rotation comprising wasted energy since the rotation would not impart any force in a direction to effect movement of the lever arms). Rotation of the modified G weight 81 engages the cups 28 and provides an additional mechanical advantage serving to improve significantly the performance of the sensor compared to the standard spherical G weight configuration whilst retaining the same level of performance for on-axis accelerations.

Figure 20:
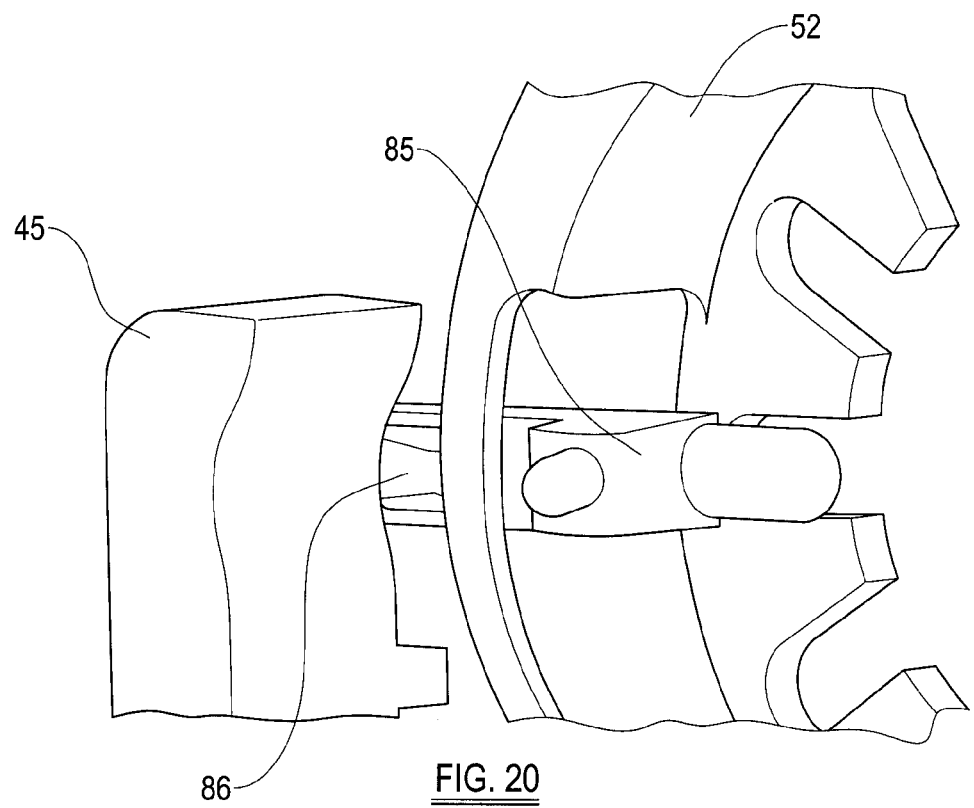
FIG. 20 shows a trip piston 86 of a sensor embodying the present invention.

FIG. 20 shows a further trigger finger 85 embodying the present invention. The features of the trigger finger 85 may be substantially identical to those as described above. However, in the embodiment shown, the contacts pads 49, 50 take a slightly different form to that shown in FIG. 11. Their function remains the same.

The shoulder 58, as described above, is replaced with a trigger piston 86. The trigger piston 86 has substantially the same function as the shoulder 58, in that it engages with a cam edge 57 of the cam plate 52 to prevent the pawl 45 from engaging the ratchet wheel 12. The trigger piston 86, however, is able to linearly translate with respect to the trigger finger 85. Further, the trigger piston 86 is biased in the direction of the cam edge 57. Thus, the trigger piston 86 is biased against the cam edge 57 of the cam plate 52 in use. Movement of the first contact pad 49 of the trigger finger 85 up the ramped side wall 42 causes the cam piston 86 to lift off from the cam edge 57 and allows the pawl to be spring biased by the torsion spring 46 into engagement with the ratchet wheel 12. As the cam piston 86 is lifted off the cam edge 57, the spring loaded cam piston 86 moves linearly in a direction towards the contact pads 49, 50.

A benefit of this arrangement is that the engagement of the pawl 45 with the ratchet 12 is improved. Without a trigger piston 86, there is the risk that as the pawl comes into contact with one of the ratchet teeth 12, the pawl may strike the tip of a tooth. This may cause damage to either or both of the pawl and tooth. Additionally, or alternatively, the impact causes the pawl to briefly rebound from the ratchet 12. As it does so, there is a risk that the trigger finger 47 will re-engage with the cam edge 57, owing to the biasing of the trigger finger 47. If this occurs, then the pawl will be returned to a reset position, even though an acceleration has been sensed which requires the pawl 45 to engage with the ratchet 12. Clearly, this is disadvantageous.

The trigger piston 86 as shown in FIG. 20 is biased such that when the trigger finger 85 is tripped, the trigger piston 86 linearly translates to an extent that accidental re-setting of the pawl 45 is less likely. If the pawl should strike and rebound from the ratchet 12, there is less chance of the trigger piston 86 engaging with the cam edge 57. Instead, following a rebound event, the biasing of the pawl toward the ratchet 12 will allow the pawl to eventually engage with the ratchet 12.

Figure 21:
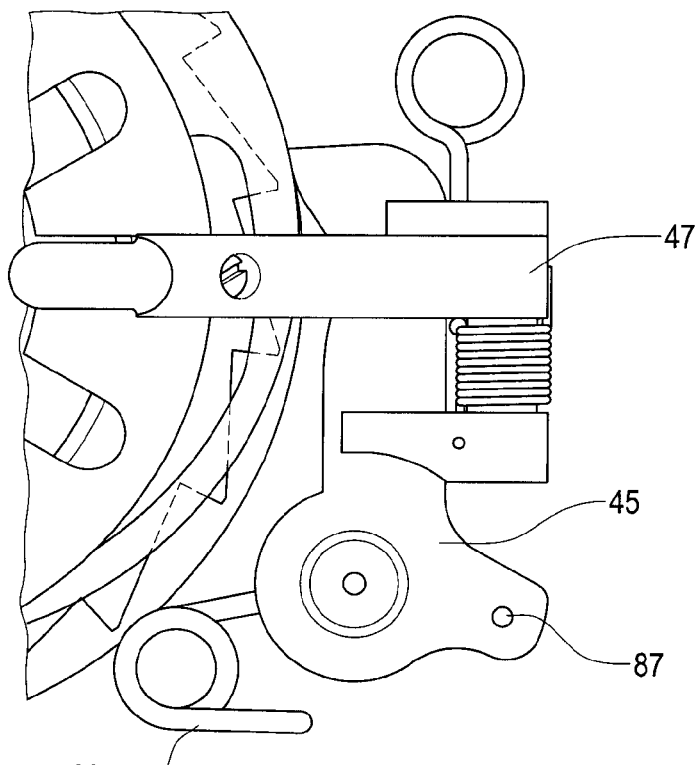
FIG. 21 shows a pawl of a sensor embodying the present invention.

FIG. 21 shows a further embodiment of the present invention. The pawl 45 is substantially the same as previously described. The trigger finger 47 is attached to the pawl 45 as previously described. The trigger finger may be the trigger finger 85 as shown in FIG. 20.

Referring briefly to FIG. 3, it will be seen that the pawl 45 has a pivot point. There is further a torsional spring 46 having a central axis that is substantially coaxial with the axis of the pivot point. The pawl 45 shown in FIG. 21, however, does not have a torsional spring that is coplanar with the pivot point.

The pawl 45 of FIG. 21 has a pivot point 87. The pawl 45 rotates around the pivot point 87, such that the end of the pawl 45 can engage with or move away from the ratchet 12. Additionally, the arrangement shown in FIG. 21 includes a torsion spring 88. One end of the spring 88 is engaged with the body 2 of the inertia reel 1. The other end of the spring 88 is engaged with a portion of the pawl 45 axially offset from the pivot point 87. An advantage of this arrangement is that as the pawl 45 engages with the ratchet 12, a limited amount of movement of the pawl in a direction tangential to the ratchet 12 is allowed.

With the arrangement shown in FIG. 9, for example, any force on the pawl in a direction tangential to the ratchet 12 is directed through the axis of the pivot point. Thus no corresponding movement of the pawl is allowed. As a consequence, the pawl 45 may strike a tooth of the ratchet 12 during engagement and rebound therefrom. This is undesirable.

The arrangement shown in FIG. 21 is advantageous in that if the pawl 45 should strike a tip of the ratchet teeth 12, an additional torque is created about the pivot point 87, which torque acts to aid the full engagement of the pawl with the ratchet teeth 12.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An acceleration sensor comprising:
a holding mechanism having a pair of lever arms operable to move independently of one another; and
an inertia weight held between the lever arms, wherein movement of the inertia weight, in use, when under acceleration, causes at least one lever arm to move; and
a trip mechanism rotatably mounted adjacent to the lever arm to engage the moving lever arm and, in response to the lever arm movement, convert the lever arm movement into a rotational movement of the trip mechanism about an axis, which rotational movement is detectable as an output of the sensor indicating acceleration of the inertia weight.

2. The acceleration sensor according to claim 1, wherein movement of the inertia weight, held between the lever arms, when under acceleration, causes one or both arms to move in a plane and about pivot axes that are substantially perpendicular to the trip mechanism rotation axis.

3. The acceleration sensor according to claim 1, wherein the pair of lever arms each has a cup portion, which cup portions face one another and hold the inertia weight therebetween, and wherein the trip mechanism is rotatably mounted adjacent to the cup portions to engage the moving lever arm.

4. The acceleration sensor according to claim 3, wherein the cup portions have substantially conical internal surfaces.

5. The acceleration sensor according to claim 1, wherein the inertia weight comprises a ball.

6. The acceleration sensor according to claim 1, wherein the inertia weight comprises a non-spherical shaped ball, having one axis of rotational symmetry.

7. The acceleration sensor according to claim 6, wherein the inertia weight comprises a ball with an equatorial bulge.

8. The acceleration sensor according to claim 1, wherein the inertia weight comprises a ball with a pair of opposed substantially conical protrusions.

9. The acceleration sensor according to claim 1, wherein the extent of rotational movement is indicative of an acceleration experienced by the inertia weight.

10. The acceleration sensor according to claim 1, wherein the trip mechanism has a centre of gravity which lies substantially in the axis of rotation.

11. An inertia reel comprising:
the acceleration sensor according to claim 1; and
a spool.

12. The inertia reel according to claim 11, wherein at least a part of the sensor is housed in a part of the spool.

13. The inertia reel according to claim 12, wherein the majority of the sensor is housed in the spool.

14. The inertia reel according to claim 11, wherein the reel also includes a strap acceleration sensor and the acceleration sensor is at least partly housed in the strap acceleration sensor.

15. The inertia reel according to claim 14, wherein the trip mechanism is rotatably mounted to a cam mechanism which holds the trigger.

16. The inertia reel according to claim 11, wherein the rotational movement trips a trigger to cause locking of the spool.

17. The inertia reel according to claim 16, wherein the trip mechanism is biased into a position by an elastic member interacting between the cam mechanism and the trip mechanism, the biasing force exerted by the elastic member being overcome by rotation of the trip mechanism under vehicular acceleration above a predetermined threshold.

18. The inertia reel according to claim 11, further comprising a strap acceleration sensor.

19. The inertia reel according to claim 18 having a common trigger tripped by actuation of either the vehicular acceleration sensor or the strap acceleration sensor.

20. The acceleration sensor of claim 1 wherein each of the pair of lever arms has a pinned end and an opposite, cupped end, and each lever arm is operable to move pivotally about its respective pinned end, and wherein the trip mechanism is rotatably mounted to engage the cupped end of the moving lever arm.

21. An acceleration sensor comprising
an inertia weight located supported at a first end of a lever arm which is mounted for pivotal movement about a second end of the lever arm and movable in a generally linear direction in response to movement of the inertia weight,
a trip mechanism rotatably mounted adjacent to the inertia weight so that movement of the inertia weight supported at the first end of the lever arm causes contact with the trip mechanism to convert lever arm movement into rotational movement of the trip mechanism, which rotation of the trip mechanism is detectable as an output of the sensor.

* * * * *